US010422649B2

(12) United States Patent
Engelman et al.

(10) Patent No.: US 10,422,649 B2
(45) Date of Patent: Sep. 24, 2019

(54) AUTONOMOUS DRIVING SENSING SYSTEM AND METHOD

(71) Applicant: Ford Global Technologies, LLC, Dearborn, MI (US)

(72) Inventors: Gerald H. Engelman, Plymouth, MI (US); Alex Maurice Miller, Canton, MI (US); Richard Lee Stephenson, Ann Arbor, MI (US); Levasseur Tellis, Southfield, MI (US); Timothy D. Zwicky, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 23 days.

(21) Appl. No.: 14/599,714

(22) Filed: Jan. 19, 2015

(65) Prior Publication Data
US 2015/0241226 A1 Aug. 27, 2015

Related U.S. Application Data

(60) Provisional application No. 61/943,590, filed on Feb. 24, 2014.

(51) Int. Cl.
*G01C 21/34* (2006.01)
*B60W 30/00* (2006.01)
*G05D 1/00* (2006.01)

(52) U.S. Cl.
CPC .............. *G01C 21/34* (2013.01); *B60W 30/00* (2013.01); *G05D 1/0088* (2013.01); *G05D 2201/0213* (2013.01)

(58) Field of Classification Search
CPC .... G01C 21/3655; G01C 21/26; G01C 21/34; G01C 21/20; G01C 21/365; G01C 21/32;
(Continued)

(56) References Cited

U.S. PATENT DOCUMENTS 5,469,356 A * 11/1995 Hawkins ................ G01C 21/26
318/591
6,487,500 B2 * 11/2002 Lemelson ............... G01S 19/11
340/436

(Continued)

FOREIGN PATENT DOCUMENTS

CN 102227612 A 10/2011
CN 202453733 U 9/2012
(Continued)

OTHER PUBLICATIONS

Madigan et al., "Creating a High-Level control Module for an Autonomous Mobile Robot Operating in an Urban Environment" The University of Texas at Austin, Apr. 2007, The DARPA Urban Challenge, 15 pages.

(Continued)

*Primary Examiner* — Calvin Cheung
(74) *Attorney, Agent, or Firm* — Frank A. MacKenzie; Bejin Bieneman PLC

(57) ABSTRACT

First and second sets of data are collected in a vehicle from respective data sources. Each of the first and second sets of data are provided for determinations respectively selected from first and second categories of autonomous vehicle operations. A determination is made to take an autonomous action selected from the first category of autonomous vehicle operations. Data is used from each of the first and second data sets relating respectively to the first and second categories of autonomous vehicle operations to determine the autonomous action.

20 Claims, 4 Drawing Sheets

(58) Field of Classification Search
CPC .......... G01C 7/04; G01C 23/00; G01C 21/16; B60W 10/184; B60W 10/20; B60W 10/06; B60W 30/12; B60W 50/16; B60W 50/14; G06K 9/00805; G06K 9/00825; G06K 9/00355; G06K 9/4609; G06K 9/4604; G06K 9/6256; G05D 1/0246; G05D 1/0676; G05D 1/0883; G05D 1/06
USPC ....... 701/1, 25, 117, 118, 26, 27, 36, 46, 70, 701/93, 96, 23, 41
See application file for complete search history.

(56) References Cited

U.S. PATENT DOCUMENTS

| | | | |
|---|---|---|---|
| 6,934,613 B2 | 8/2005 | Yun | |
| 7,124,027 B1* | 10/2006 | Ernst, Jr. | B60W 30/09 701/301 |
| 8,280,623 B2* | 10/2012 | Trepagnier | G01S 17/023 180/167 |
| 8,315,796 B2* | 11/2012 | Yamaguchi | G01C 21/36 340/995.2 |
| 8,412,449 B2 | 4/2013 | Trepagnier et al. | |
| 8,700,251 B1* | 4/2014 | Zhu | G05D 1/02 701/25 |
| 8,706,394 B2* | 4/2014 | Trepagnier | G01S 17/023 340/436 |
| 8,755,967 B1* | 6/2014 | Ferguson | G01S 17/89 180/167 |
| 8,761,990 B2* | 6/2014 | Chrysanthakopoulos | G05D 1/024 375/240.16 |
| 8,773,251 B2* | 7/2014 | Morris | B60R 16/0232 340/439 |
| 8,788,134 B1* | 7/2014 | Litkouhi | B62D 15/0255 701/23 |
| 8,825,259 B1* | 9/2014 | Ferguson | G05D 1/0214 104/124 |
| 8,838,321 B1* | 9/2014 | Ferguson | G05D 1/0289 340/901 |
| 8,933,834 B2* | 1/2015 | Nakanishi | G01S 13/931 342/104 |
| 8,989,943 B2* | 3/2015 | You | G05D 1/0297 180/170 |
| 8,996,228 B1* | 3/2015 | Ferguson | G01C 21/3461 701/28 |
| 9,145,139 B2* | 9/2015 | Ferguson | B60W 30/09 |
| 9,164,511 B1* | 10/2015 | Ferguson | G05D 1/0231 |
| 9,652,980 B2* | 5/2017 | Zhang | G08G 1/00 |
| 2001/0020216 A1* | 9/2001 | Lin | G01C 21/165 701/472 |
| 2005/0149251 A1* | 7/2005 | Donath | G01C 21/26 701/532 |
| 2008/0275618 A1* | 11/2008 | Grimm | G08G 1/162 701/96 |
| 2009/0268946 A1* | 10/2009 | Zhang | G06K 9/00791 382/104 |
| 2009/0292468 A1* | 11/2009 | Wu | G01S 13/726 701/301 |
| 2010/0004856 A1* | 1/2010 | Kobori | G01S 19/48 701/532 |
| 2010/0030421 A1 | 2/2010 | Yoshimura et al. | |
| 2010/0104199 A1* | 4/2010 | Zhang | G06K 9/00798 382/199 |
| 2010/0106356 A1* | 4/2010 | Trepagnier | G01S 17/023 701/25 |
| 2010/0114416 A1* | 5/2010 | Au | G01C 21/165 701/23 |
| 2010/0198491 A1* | 8/2010 | Mays | B60W 30/09 701/124 |
| 2010/0256852 A1* | 10/2010 | Mudalige | G08G 1/163 701/24 |
| 2011/0190972 A1* | 8/2011 | Timmons | G01C 21/34 701/31.4 |
| 2012/0173069 A1* | 7/2012 | Tsimhoni | G01C 21/365 701/25 |
| 2012/0310465 A1* | 12/2012 | Boatright | B60Q 1/346 701/25 |
| 2013/0060413 A1* | 3/2013 | Lee | B62D 1/286 701/23 |
| 2013/0060414 A1* | 3/2013 | Lee | B62D 1/286 701/23 |
| 2013/0151058 A1* | 6/2013 | Zagorski | B60W 30/09 701/23 |
| 2013/0179023 A1* | 7/2013 | Schmidt | G05D 1/021 701/23 |
| 2013/0191003 A1 | 7/2013 | Hahne et al. | |
| 2014/0207325 A1* | 7/2014 | Mudalige | B62D 15/025 701/26 |
| 2014/0330479 A1* | 11/2014 | Dolgov | B60W 30/16 701/28 |
| 2015/0145995 A1* | 5/2015 | Shahraray | H04W 4/70 348/148 |
| 2015/0254986 A1* | 9/2015 | Fairfield | G08G 1/22 707/687 |
| 2015/0356867 A1* | 12/2015 | Bogren | G08G 1/0112 340/905 |

FOREIGN PATENT DOCUMENTS

| | | |
|---|---|---|
| KR | 20130015739 | 2/2013 |
| WO | WO 2009037018 | 3/2009 |

OTHER PUBLICATIONS

Notification of First Office Action from State Intellectual Property Office of the People's Republic of China (SIPO) dated Apr. 28, 2018 (with English translation) regarding Application 201510086806.1 (59 pages).

* cited by examiner

AUTONOMOUS DRIVING SENSING SYSTEM AND METHOD

RELATED APPLICATION

This application claims priority to U.S. provisional patent application Ser. No. 61/943,590, entitled "AUTONOMOUS DRIVING SENSING SYSTEM AND METHOD," filed Feb. 24, 2014, the contents of which application are hereby incorporated herein by reference in their entirety.

BACKGROUND

A vehicle, particularly a vehicle being operated autonomously or semi-autonomously, may obtain data concerning surrounding conditions via a variety of mechanisms, e.g., sensors or the like included in the vehicle. Sensor data can provide information concerning environmental conditions, edges of a road or lanes in a road, etc., and can be used to formulate an appropriate speed for a vehicle, an appropriate path for a vehicle, etc. However, existing vehicle sensor data suffer from limitations with respect to information that may be determined therefrom. For example, a vehicle computer may not be able to take advantage of data from a variety of sensors, concerning a variety of phenomena, in a variety of formats, etc.

DRAWINGS

DESCRIPTION

Introduction

Figure 1:
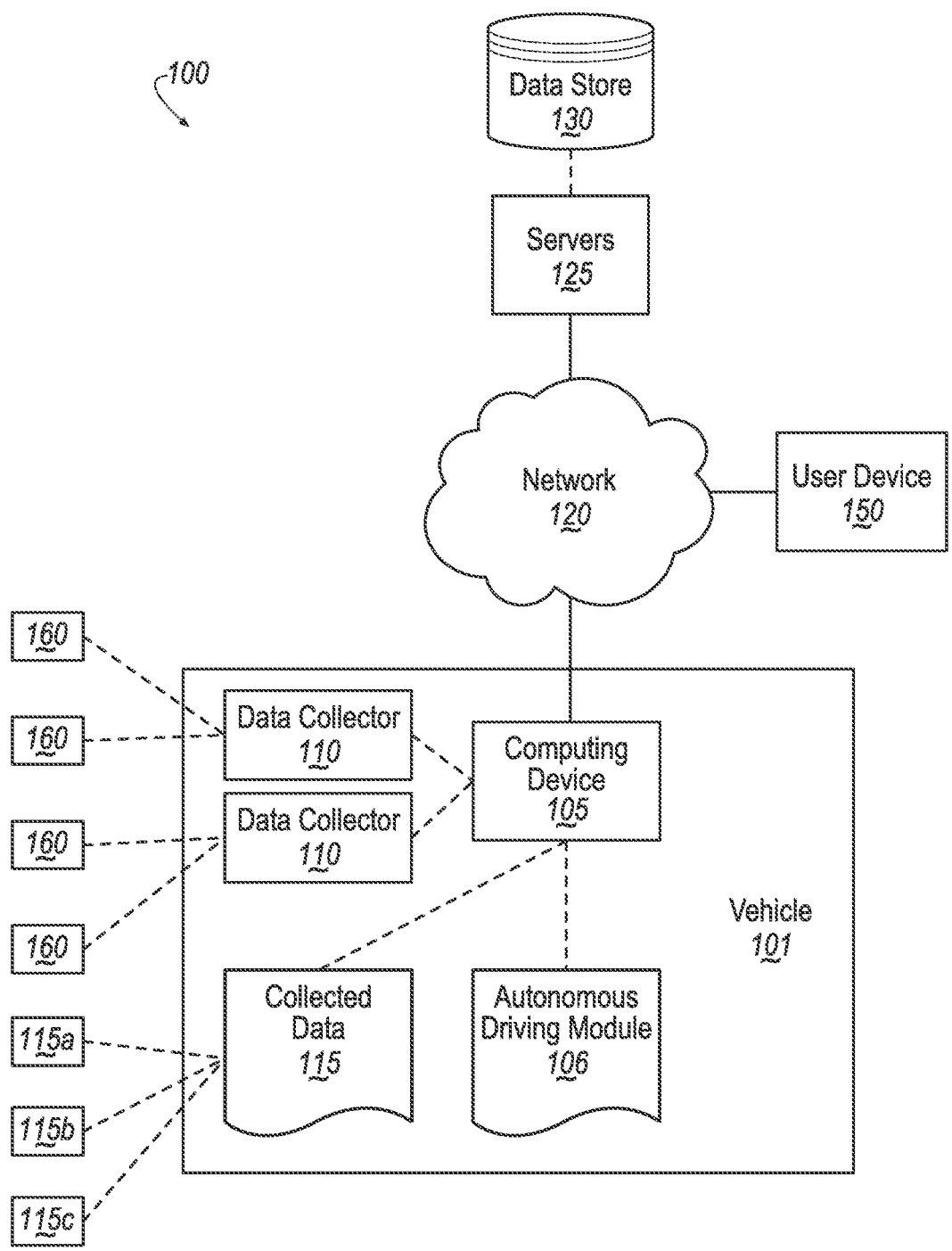
FIG. 1 is a block diagram of an exemplary autonomous vehicle sensing system.

FIG. 1 is a block diagram of an exemplary autonomous vehicle system 100 that includes a vehicle 101 provided with one or more sensor data collectors 110 that gather collected data 115 relating to an environment proximate to the vehicle 101, e.g., including a roadway 155 (illustrated in FIG. 2) and areas proximate thereto, one or more target objects 160, etc. A computing device 105 in the vehicle 101 generally receives the collected data 115, and further includes an autonomous driving module 106, e.g., as a set of instructions stored in a memory of, and executable by a processor of, the computing device 105, whereby some or all operations of the vehicle 101 may be conducted autonomously or semi-autonomously, i.e., without human control and/or with limited human intervention.

The collected data 115 includes data concerning a roadway 155 and/or surrounding environment, including one or more targets 160, which data 115 may be used by the vehicle 101 computer 105 to make determinations concerning vehicle 101 operations, including autonomous operations of the vehicle 101. Because the collected data 115 may relate to a variety of different aspects of a vehicle 101 environment and/or targets 160, and may include data 115 in a variety of formats for a variety of different sensor data collectors 110, the computer 105 may further be configured to utilize various mechanisms for integrating, or fusing, various data 115 to make determinations concerning one or more actions in the vehicle 101.

For example, the computer 105 may be programmed to execute autonomous tasks that fall into one or more categories, including strategic, tactical, and operational tasks. A strategic task is defined herein as making a decision relating to vehicle 101 routing, e.g., determining an optimal route to a destination or waypoint, re-routing a vehicle 101 because of traffic conditions or road conditions, etc. A tactical task is defined herein as determining a vehicle 101 speed and/or steering while traversing a route that has been determined for the vehicle 101. Thus, examples of tactical tasks include making lane changes, braking, accelerating, maintaining a predetermined distance from one or more surrounding vehicles, etc. An operational task includes control of operation of various vehicle 101 components to support implementation of tactical tasks, e.g., determining appropriate lateral or longitudinal control of a vehicle 101 but actuating a throttle to increase power to a powertrain, actuating brakes, actuating steering to change a steering angle, etc. Various collected data 115 may be used to support these various categories of tasks. Advantageously, data typically dedicated to one category of task may be used to support another category of task. For example, global positioning system (GPS) data 115 may be available to support the strategic task of vehicle 101 routing. However, GPS data 115 could also be used to support tactical tasks such as determining and adjusting vehicle 101 speed.

Exemplary System Elements

A vehicle 101 includes a vehicle computer 105 that generally includes a processor and a memory, the memory including one or more forms of computer-readable media, and storing instructions executable by the processor for performing various operations, including as disclosed herein. For example, the computer 105 generally includes, and is capable of executing, instructions to select an autonomous operation mode, to adjust an autonomous operation mode, to change an autonomous operation mode, etc., of the vehicle 101.

Further, the computer 105 may include or be communicatively coupled to, e.g., via a vehicle 101 communications bus as described further below, more than one computing device, e.g., controllers or the like included in the vehicle 101 for monitoring and/or controlling various vehicle components, e.g., an engine control unit (ECU), transmission control unit (TCU), etc. The computer 105 is generally configured for communications on a network in the vehicle 101 such as a controller area network (CAN) bus or the like. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure. Further, as mentioned below, various controllers and the like, e.g., an ECU, TCU, etc., may provide data 115 to the computer 105 via a vehicle 101 network, e.g., a CAN bus or the like.

In addition, the computer 105 may be configured for communicating with one or more remote computers 125 via the network 120, which, as described below, may include various wired and/or wireless networking technologies, e.g., cellular, Bluetooth, wired and/or wireless packet networks, etc. Further, the computer 105, e.g., as part of the module 106, generally includes instructions for receiving data, e.g., from one or more data collectors 110 and/or a human machine interface (HMI), such as an interactive voice response (IVR) system, a graphical user interface (GUI) including a touchscreen or the like, etc.

As already mentioned, generally included in instructions stored in and executed by the computer 105 is an autonomous driving module 106. Using data received in the computer 105, e.g., collected data 115 from data collectors 110, the server 125, etc., the module 106 may make various determinations and/or control various vehicle 101 components and/or operations without a driver to operate the vehicle 101. For example, the module 106 may be used to regulate vehicle 101 operational behaviors such as speed, acceleration, deceleration, steering, etc., as well as tactical behaviors such as a distance between vehicles and/or amount of time between vehicles, lane-change minimum gap between vehicles, left-turn-across-path minimum, time-to-arrival at a particular location, intersection (without signal) minimum time-to-arrival to cross the intersection, etc. Also, the module 106 may make strategic determinations based on data 115, e.g., of a vehicle 101 route, waypoints on a route, etc.

Data collectors 110 may include a variety of devices. For example, various controllers in a vehicle, as mentioned above, may operate as data collectors 110 to provide collected data 115 via the CAN bus, e.g., collected data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Data collectors 110 could also include sensors or the like, e.g., medium-range and long-range sensors, for detecting, and possibly also obtaining information from, targets 160, e.g., as described further below, as well as other conditions outside the vehicle 101. For example, sensor data collectors 110 could include mechanisms such as radios, RADAR, lidar, sonar, cameras or other image capture devices, that could be deployed to detect targets 160 and/or obtain other collected data 115 relevant to autonomous operation of the vehicle 101, e.g., measure a distance between the vehicle 101 and other vehicles or objects, to detect other vehicles or objects, and/or to detect road conditions, such as curves, potholes, dips, bumps, changes in grade, etc. As yet a further example, GPS data 115 could be combined with 2D and/or 3D high resolution digital map data and/or basic data known as "Electronic Horizon data, such data, e.g., being stored in a memory of the computer 105. Based on data 115 relating to dead reckoning in a known manner, and/or some other simultaneous localization and mapping (SLAM) and/or localization computation such as is known, possibly using GPS data 115, digital map data 115 can be used as relevant data for the computer 105 to use when determining a vehicle 101 path or supporting a path planner, as well as other decision making processes for tactical driving decisions.

A memory of the computer 105 generally stores collected data 115, e.g., as one or more sets of data 115a, 115b, and/or 115c, where data 115a relates to GPS or map data, e.g., as discussed herein, data 115b is data from vehicle 101 sensors, and data 115c is sensor data from one or more other vehicles, e.g., as discussed below. Collected data 115 may include a variety of data collected in a vehicle 101 from data collectors 110, including data 115 obtained from one or more targets 160. Examples of collected data 115 are provided above and below, e.g., with respect to targets 160, and moreover, data 115 may additionally include data calculated therefrom in the computer 105. In general, collected data 115 may include any data that may be gathered by a collection device 110 and/or computed from such data, e.g., raw sensor 110 data 115 values, e.g., raw radar or lidar data 115 values, derived data values, e.g., a distance of an object 160 calculated from raw radar data 115, measured data values, e.g., provided by an engine controller or some other control and/or monitoring system in the vehicle 101. In general, various types of raw data 115 may be collected, e.g., image data 115, data 115 relating to reflected light or sound, data 115 indicating an amount of ambient light, a temperature, a speed, an acceleration, a yaw, etc.

Accordingly, in general, collected data 115 could include a variety of data 115 related to vehicle 101 operations and/or performance, as well as data related to in particular relating to motion of the vehicle 101. For example, in addition to data 115 obtained from a target 160 such as discussed below, collected data 115 could include data concerning a vehicle 101 speed, acceleration, braking, lane changes and or lane usage (e.g., on particular roads and/or types of roads such as interstate highways), average distances from other vehicles at respective speeds or ranges of speeds, and/or other data 115 relating to vehicle 101 operation.

In addition, collected data 115 could be provided from the remote server 125 and/or one or more other vehicles 101, e.g., using vehicle-to-vehicle communications. Various technologies, including hardware, communication protocols, etc., are known for vehicle-to-vehicle communications. For example, vehicle-to-vehicle messages could be sent and received according to Dedicated Short Range Communications (DSRC), or the like. As is known, DSRC are relatively low-power operating over a short to medium range in a spectrum specially allocated by the United States government in the 5.9 GHz band. In any case, information in a vehicle-to-vehicle message could include collected data 115 such as a position (e.g., according to geo-coordinates such as a latitude and longitude), speed, acceleration, deceleration, etc. of a transmitting vehicle 101. Further, a transmitting vehicle 101 could provide other data 115, such as a position, speed, etc. of one or more targets 160.

The network 120 represents one or more mechanisms by which a vehicle computer 105 may communicate with a remote server 125 and/or a user device 150. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115 received from one or more vehicles 101.

Additionally or alternatively, the server may provide data 115 for use by a vehicle computer 105, e.g., in a module 106. In general, a combination of data 115 from different sources, e.g., the data store 130 via the server 125, other vehicles 101, and/or data collectors 110 in a vehicle 101, may be synthesized and/or combined to provide the basis for an alert, message, and/or autonomous operation. For example, a first vehicle 101 could detect an object 160 in a roadway 155. The object 160 could be classified as a potential obstruction, but then determined, e.g., when the first vehicle 101 gets closer to the object 160, to be of a size, shape, and/or location that does not risk impeding progress of the first vehicle 101. The first vehicle 101 could then provide data 115 concerning the object 160 to the server 125, which could store such data 115 in the data store 130. The data 115 concerning the object 160 could then be provided to one or more second vehicles 101 in an area proximate to the object 160, whereby the second vehicles 101 could benefit from data 115 indicating that the object 160 did not in fact pose a risk to the second vehicles 101. Accordingly, a vehicle 101 can use its own history of operations and/or history recorded by other vehicles 101 for making determinations concerning autonomous operations.

A user device 150 may be any one of a variety of computing devices including a processor and a memory, as well as communication capabilities. For example, the user device 150 may be a portable computer, tablet computer, a smart phone, etc. that includes capabilities for wireless communications using IEEE 802.11, Bluetooth, and/or cellular communications protocols. Further, the user device 150 may use such communication capabilities to communicate via the network 120 including with a vehicle computer 105. A user device 150 could communicate with a vehicle 101 computer 105 the other mechanisms, such as a network in the vehicle 101, a known protocols such as Bluetooth, etc. Accordingly, a user device 150 may be used to carry out certain operations herein ascribed to a data collector 110, e.g., voice recognition functions, cameras, global positioning system (GPS) functions, etc., in a user device 150 could be used to provide data 115 to the computer 105. Further, a user device 150 could be used to provide a human machine interface (HMI) to the computer 105.

Figure 2:
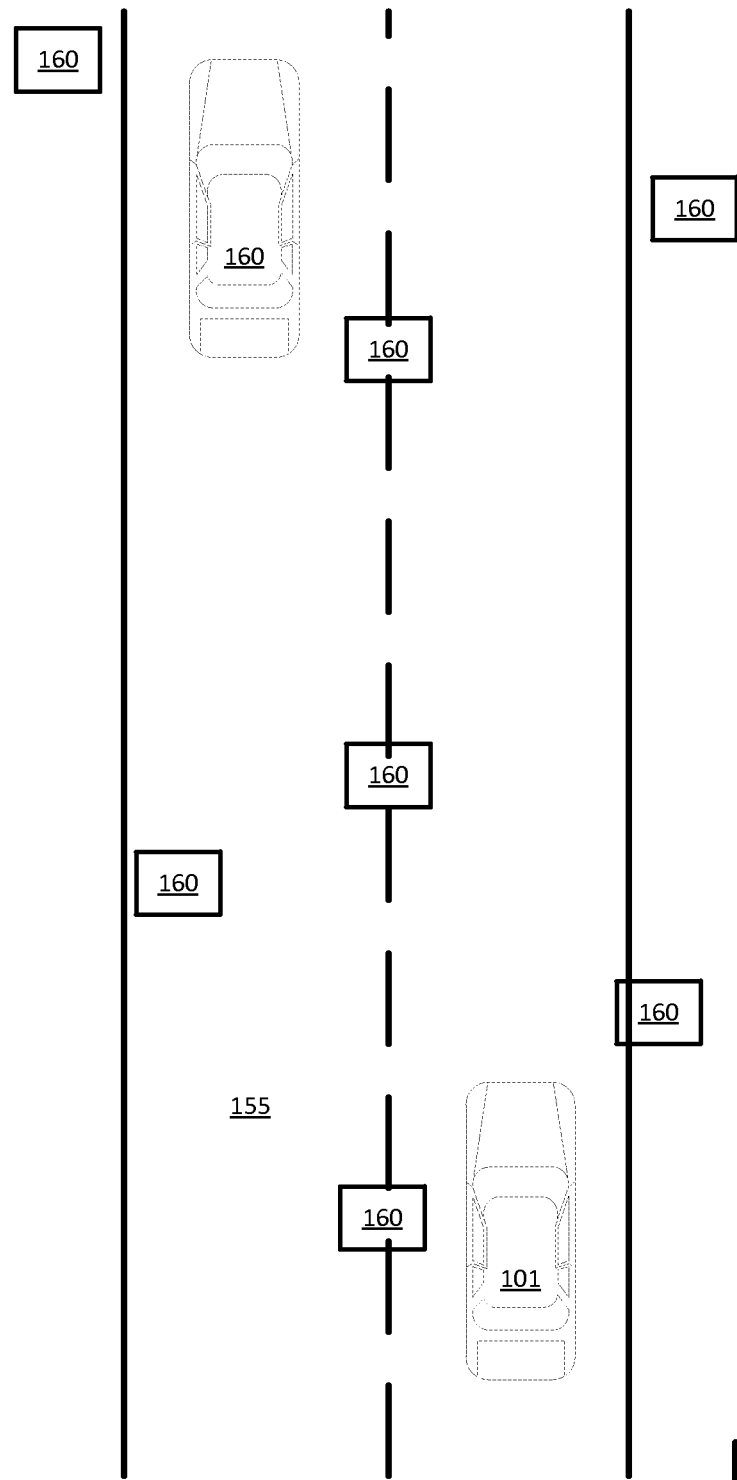
FIG. 2 is a block diagram of a vehicle roadway including sensor markers.

As seen in FIG. 2, one or more targets 160 may be proximate to a roadway 155. A target or object 160 may be any one of a variety of objects, such as a vehicle 101, a rock, a sign, a bump, a barrier, a lane marking, a streetlight, a stoplight, an intersection, etc. In this context, the meaning of "proximate" includes traveling on, stationary on, being embedded or fixed in, or being located on or above, e.g., a sign or the like on a post within a few feet of, a surface of a roadway 155 or a surface near a roadway 155, e.g., on, near, or adjacent to a roadway 155 shoulder, etc. Further, a target 160 could be proximate to a roadway 155 by being suspended above the roadway 155, e.g., on a side or underside of a bridge, on a structure configured to suspend signs over the roadway, etc. In general, for a target 160 to be proximate to a roadway 155 means that the target 160 is located such that the target 160 is detectable by one or more data collectors 110 in a vehicle 101 traversing the roadway 155 with respect to which the target 160 is proximate.

Exemplary Process Flows

Figure 3:
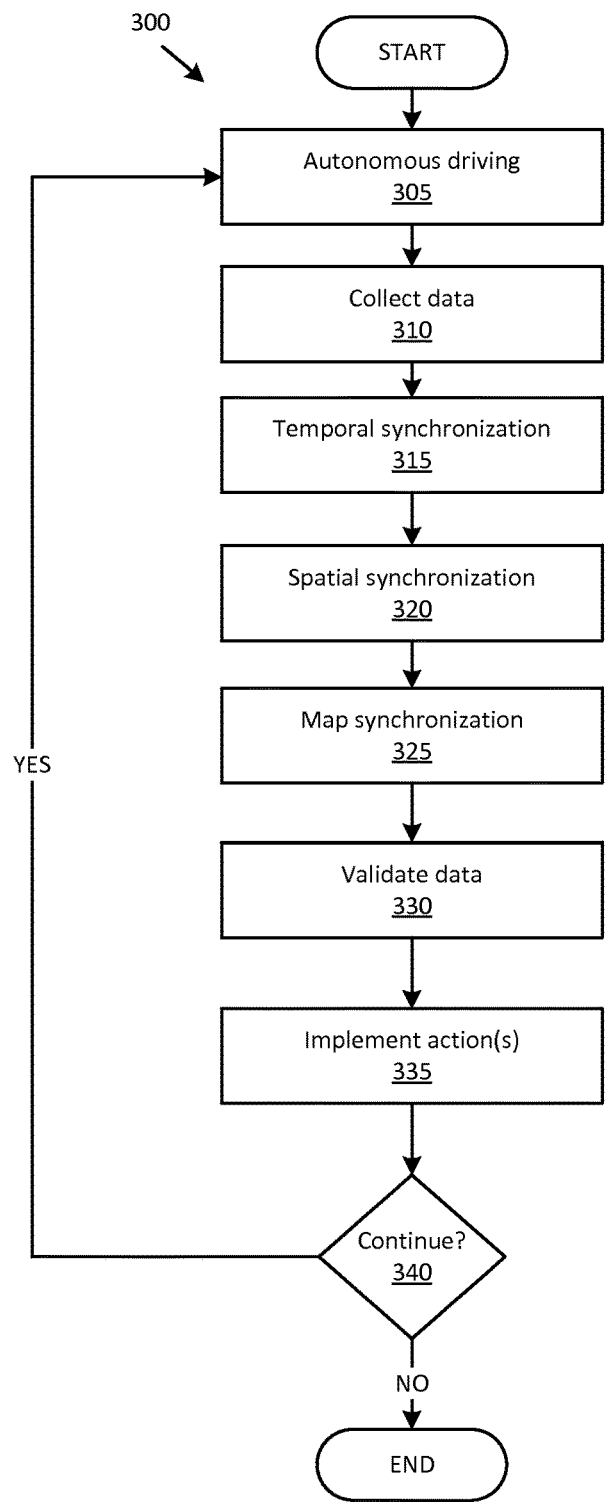
FIG. 3 is a diagram of an exemplary process for an autonomous vehicle sensing system in an autonomous mode.

FIG. 3 is a diagram of an exemplary process for an autonomous vehicle 101 sensing system in an autonomous mode.

The process 300 begins in a block 305, in which a vehicle 101 conducts autonomous driving operations. That is, the vehicle 101 is operated partially or completely autonomously, i.e., a manner partially or completely controlled by the autonomous driving module 106, which may be configured to operate the vehicle 101 according to collected data 115. For example, all vehicle 101 operations, e.g., steering, braking, speed, etc., could be controlled by the module 106 in the computer 105. It is also possible that, in the block 305, the vehicle 101 may be operated in a partially or semi-autonomous, i.e., partially manual, fashion, where some operations, e.g., braking, could be manually controlled by a driver, while other operations, e.g., including steering, could be controlled by the computer 105. Likewise, the module 106 could control when a vehicle 101 changes lanes. Further, it is possible that the process 300 could be commenced at some point after vehicle 101 driving operations begin, e.g., when manually initiated by a vehicle occupant through a user interface of the computer 105.

Next, in a block 310, data collectors 110 obtain collected data 115. For example, camera data collectors 110 may collect image data 115, an engine control unit may provide RPM data 115, a speed sensor 110 may provide speed data 115, as well as other kinds of data, e.g., radar, lidar, acoustic, etc., data 115.

Next, in a block 315, collected data 115, e.g., collected within a predetermined period of time, is temporally synchronized. That is, one or more collected data 115 may be assigned a same timestamp or the like, indicating that each of the data 115 so marked represent a same time relating to sensed data 115. Further, collected data 115 could be associated with a location, e.g., latitude and longitude geo-coordinates or the like determined by a data collector 110 in the vehicle 101 using the global positioning system (GPS) or the like, and could be synchronized or associated with other collected data 115 according to like locations associated with the collected data 115.

Next, in a block 320, collected data 115 that has been temporally synchronized, i.e., associated with a specified time or period of time as described above with respect to the block 315, is then spatially synchronized. For example, a vehicle 101 may include global positioning system (GPS) data 115, and in addition may determine location information, e.g., a position, speed, acceleration, and/or deceleration, etc. of one or more targets 160, possibly including other vehicles 101. For example, a target 160 location may be determined using image data 115, radar data 115, lidar data 115, etc. Further, as mentioned above, a vehicle 101 may receive data 115 in one or more vehicle-to-vehicle communications from one or more second vehicles 101 and/or from a remote server 125 via the network 120. Such data 115 received from external sources may likewise be temporally and spatially synchronized, including with data 115 gathered in a vehicle 101, as described with respect to these blocks 315, 320.

Next, in a block 325, collected data 115 may be synchronized to a set of map data. For example, the computer 105 may store in a memory map information respectively correlated to geo-coordinates in an area surrounding a vehicle, e.g., indicating roads, landmarks, characteristics of roads such as speed limits, number of lanes, directions of travel, presence construction, etc. In the block 325, such map data is associated with data 115 having spatial coordinates at or near coordinates indicated by the map data.

Next, in a block 330, the computer 105 performs a data validation step. For example, various data 115 may be checked to determine that the data 115 is in an acceptable range, e.g., speed data 115 above a predetermined threshold set at or above likely speeds of a vehicle 101 could be deemed invalid, etc.

Next, in a block 335, the computer 105 may determine that at least one strategic, tactical, or operational action is appropriate, e.g., selecting or changing a vehicle 101 route, reducing speed to conform to a speed limit, changing lanes, slowing to an appropriate speed for possible flood conditions, changing a distance between the vehicle 101 and another vehicle, etc. However, in some instances, the computer 105 may determine that no action is warranted. For example, a target 160 may indicate a speed limit change, or unavailability of a particular lane in a roadway, where a vehicle 101 is traveling under the new speed limit, in an available lane, etc. In any case, the computer 105 implements any action determined in the block 335. For example, a speed, distance from other vehicles, lane of travel, etc., may be adjusted as described above. As part of determining whether an action is appropriate, and/or determining an action to implement, the computer 105 selects a datum or data 115 to support the action. In some cases, the computer 105 may select a datum 115 typically used for a first category of decision-making, e.g., strategic determinations, for a second category of decision-making, e.g., tactical determinations. A process 400 for determining data 115 for use in determining an autonomous action of the vehicle 101 is described below with respect to FIG. 4.

In the block 340, which follows the block 335, the computer 105 determines whether the process 300 should continue. For example, the process 300 may end if autonomous driving operations end and a driver resumes manual control, if the vehicle 101 is powered off, etc. In any case, if the process 300 should not continue, the process 300 ends following the block 340. Otherwise, the process 300 proceeds to the block 305.

Figure 4:
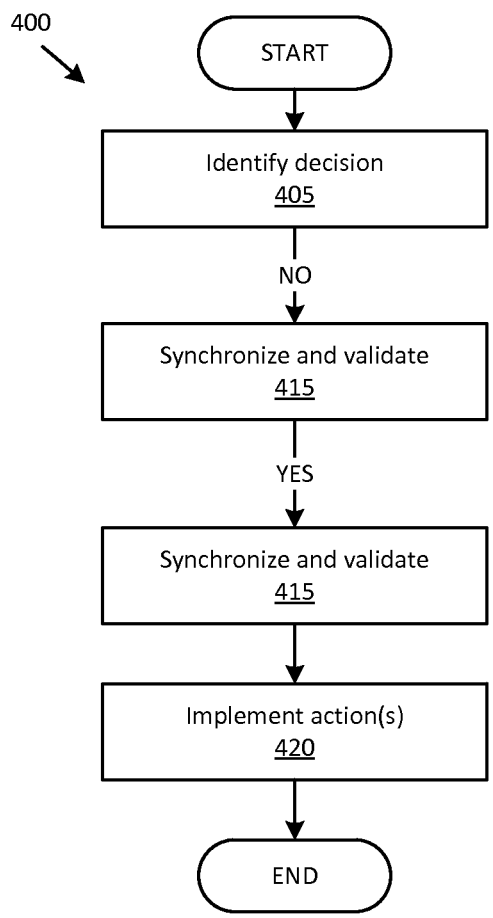
FIG. 4 is a diagram of an exemplary process for determining data for use in implementing an autonomous action in a vehicle.

FIG. 4 is a diagram of an exemplary process 400 for determining data 115 for use in implementing an autonomous action in a vehicle 101. The process 400 begins in a block 405, in which a vehicle 101 computer 105, e.g., according to instructions in an autonomous module 106, identifies a decision to be made with respect to a potential autonomous action in the vehicle 101. For example, as discussed above, the computer 105 could identify various strategic, tactical, and/or operational decisions, such as a need to determine a route for the vehicle 101, determining whether the vehicle 101 should change lanes, determining whether to adjust a speed of the vehicle 101, etc.

Next, in a block 410, the computer 105 identified data 115 for the decision or determination identified in the block 405. For example, the computer 105 determines whether data 115 received as relevant to the decision or determination identified in the block 405 is adequate for making the decision or determination, and/or whether data 115 typically supplied for another category of decision could be used to supplement data 115 received as relevant to the decision or determination. For example, to determine whether to change lanes, the computer 105 may typically use data 115 from radar and/or lidar sensors 110. However, GPS data 115 could also be useful, e.g., by providing information relevant to upcoming roadway features such as a narrowing of a roadway, upcoming construction, presence of an entrance or exit ramp that could affect traffic patterns, etc. Further, in addition to determining whether a particular type of data 115 could be used, the computer 105 could also limit uses of particular types of data 115 according to a driving context. For example, use of GPS data 115 to support a tactical operation could be limited to situations in which a vehicle 101 is driving on a roadway classified as a highway, e.g., a four-lane highway or the like.

In sum, in the block 410, the computer 105 determines whether to include, in addition to data 115 related to a category of a decision, additional data 115 related to a second category. If no useful data in a second category is found, then the process 400 ends following the block 410. Otherwise, the process 400 proceeds to a block 415.

In the block 415, the computer 105 synchronizes and validates data 115, e.g., as described above.

Following the block 415, in a block 420, the computer 105 implements an action using identified data 115 as described above. Following the block 415, the process 400 ends.

CONCLUSION

Computing devices such as those discussed herein generally each include instructions executable by one or more computing devices such as those identified above, and for carrying out blocks or steps of processes described above. For example, process blocks discussed above are embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method implemented in a computer in a vehicle, the method comprising:
   identifying an operational task that is a decision to actuate a throttle or a brake to adjust a vehicle speed or to actuate a steering to adjust a vehicle steering angle;
   collecting a first set of data dedicated to the operational task;
   determining to include additional data related to the decision;
   then, after collecting the first set of data and in response to determining to include the additional data, selecting a second set of data dedicated to a second task that is other than the operational task, the second set of data different than the first set of data and usable for making the decision;
   collecting the second set of data;
   determining to adjust the vehicle speed or adjust the vehicle steering angle according to the first set of data and the second set of data; and
   controlling, according to the determination, the vehicle speed by actuating the throttle or the brake, or the vehicle steering angle by actuating the steering.

2. The method of claim 1, wherein the second set of data includes GPS data.

3. The method of claim 1, wherein the first set of data is derived from data collected from sensors in the vehicle.

4. The method of claim 1, wherein the second task relates to one of a vehicle roadway, an object proximate to the vehicle, and a second vehicle.

5. The method of claim 1, wherein the second task is one of determining a route for the vehicle and determining whether the vehicle should change lanes.

6. The method of claim 1, wherein the first set of data or the second set of data include data from each of a sensor in the vehicle and a remote server.

7. The method of claim 1, further comprising synchronizing the data using at least one of a timestamp and geo-coordinates.

8. The method of claim 1, further comprising, before collecting the first set of data, determining that the vehicle is travelling on a roadway having a classification that permits use of the first set of data.

9. The method of claim 1, wherein the second set of data is derived from data collected from sensors in one or more second vehicles.

10. The method of claim 1, wherein the second task is a strategic task to determine a route to a destination.

11. The method of claim 1, wherein the second task is a tactical task to determine vehicle speed or steering while traversing a route.

12. A system, comprising:
    a computer configured to be installed in a vehicle, the computer including a processor and a non-transitory memory, the memory storing instructions executable by the processor such that the computer is programmed to:
       identify an operational task that is a decision to actuate a throttle or a brake to adjust vehicle speed or to actuate a steering to adjust a vehicle steering angle;
       determine to include additional data related to the decision;
       collect a first set of data dedicated to the operational task;
       then, after collecting the first set of data and in response to determining to include the additional data, select a second set of data dedicated to a second task that is other than the operational task, the second set of data different than the first set of data and usable for making the decision;
       collect the second set of data;
       determine to adjust the vehicle speed or adjust the vehicle steering angle according to the first set of data and the second set of data; and
       control, according to the determination, the vehicle speed by actuating the throttle or the brake, or the vehicle steering angle by actuating the steering.

13. The system of claim 12, wherein the second set of data includes GPS data.

14. The system of claim 12, wherein the first set of data is derived from data collected from sensors in the vehicle.

15. The system of claim 12, wherein the second task relates to one of a vehicle roadway, an object proximate to the vehicle, and a second vehicle.

16. The system of claim 12, wherein the second task is one of determining a route for the vehicle and determining whether the vehicle should change lanes.

17. The system of claim 12, wherein the first set of data or the second set of data include data from each of a sensor in the vehicle and a remote server.

18. The system of claim 12, wherein the computer is further programmed to synchronize the data using at least one of a timestamp and geo-coordinates.

19. The system of claim 12, wherein the computer is further programmed to determine, before collecting the first set of data, that the vehicle is travelling on a roadway having a classification that permits use of the first set of data.

20. The system of claim 12, wherein the second set of data is derived from data collected from sensors in one or more second vehicles.

* * * * *